No. 666,406. Patented Jan. 22, 1901.
F. E. BOCORSELSKI.
UNIVERSAL JOINT.
(Application filed Oct. 29, 1900.)
(No Model.)
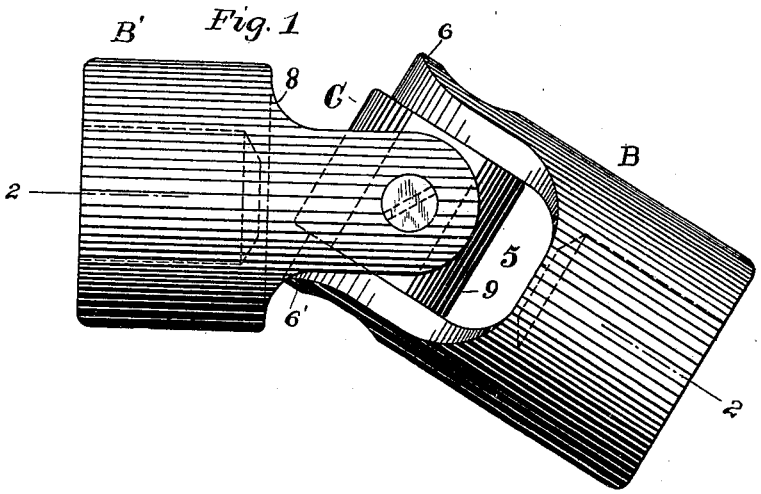
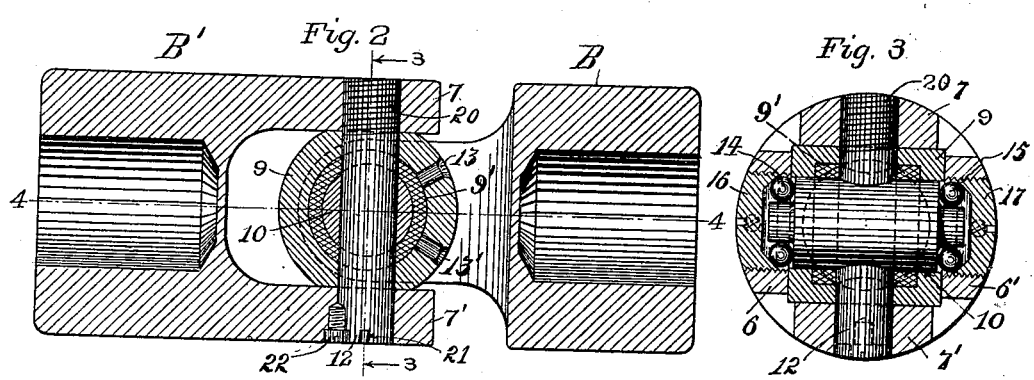 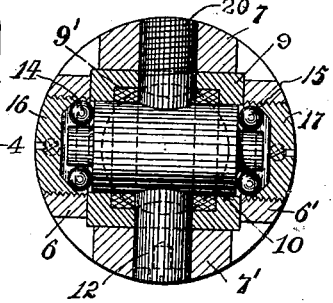
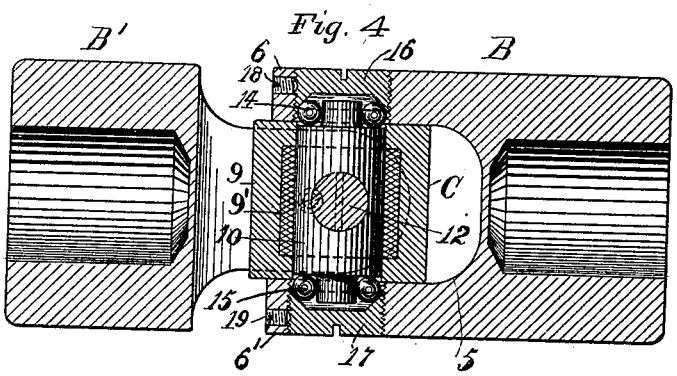
Witnesses
Wm. P. Laraway
L. C. Wood
Inventor
Frank E. Bocorselski,
by C. C. Whitney
his Attorney.
THE NORRIS PETERS CO., PHOTO-LITHO., WASHINGTON, D. C.

UNITED STATES PATENT OFFICE.

FRANK E. BOCORSELSKI, OF HARTFORD, CONNECTICUT.

UNIVERSAL JOINT.

SPECIFICATION forming part of Letters Patent No. 666,406, dated January 22, 1901.

Application filed October 29, 1900. Serial No. 34,769. (No model.)

*To all whom it may concern:*

Be it known that I, FRANK E. BOCORSELSKI, a citizen of the United States of America, and a resident of the city and county of Hartford, in the State of Connecticut, have invented certain new and useful Improvements in Universal Joints, of which the following is a specification.

This invention relates to universal joints and is in the nature of an improvement upon the universal joint shown and described in Letters Patent of the United States No. 658,057, granted to me September 18, 1900, to which reference may be had.

An object of the present invention is to furnish an improved, inexpensive, simplified, durable, and efficient joint adapted for use as an actuating-connector between two obliquely-disposed rotative members, such as shafts, subject to deflection or angular adjustment within certain limits and also to so construct and organize the parts of said joint that they may be readily assembled and disassembled.

A further object of the invention is to provide an improved universal joint embodying two forked shaft-sections, two relatively rotative intersecting pins or members connecting said sections, and an oil-chamber surrounding one of said members and adapted automatically to supply oil to the bearing parts as required.

A further object of the invention is to provide an improved universal joint having two forked shaft-sections which are connected together by a universal or gyroscopic coupling center or device supported upon antifriction elements, such as balls, which take the end thrust of said coupling-center.

With these objects in view the invention consists in certain details of construction and in the combination and arrangement of the several parts of the universal joint, substantially as hereinafter described, and more particularly pointed out in the claims.

In the drawings accompanying and forming part of this specification, Figure 1 is a side view of a universal joint embodying my present invention, one shaft-section of the joint being shown disposed at an angle of about thirty degrees with relation to the other. Fig. 2 is a central longitudinal section of the universal joint with one of the coupling-pins in elevation, said section being taken on a line corresponding with the dotted line 2 2 in Fig. 1. Fig. 3 is a cross-sectional view of the joint, taken on a line corresponding with the dotted line 3 3 in Fig. 2 looking in the direction of the arrow. Fig. 4 is another central longitudinal section of the universal joint, taken on a line corresponding with the dotted line 4 4 in Fig. 2.

Similar characters refer to like parts in all the figures of the drawings.

The universal joint embodying my present invention comprises in the construction and organization thereof shown in the accompanying drawings three essential elements, to wit: two bifurcated or forked coupling-heads or shaft-sections (designated in a general way by B and B', respectively) and a gyroscopic coupling-center or universal connector (designated in a general way by C) of novel specific construction and organization disposed between and operatively connecting the two forked shaft-sections. In the drawings both coupling-heads or shaft-sections B and B' are shown of the same general construction, and for convenience certain duplicate parts thereof are indicated by corresponding characters.

Each coupling-head, stub, or shaft-section is shown consisting of a cylindrical body portion of uniform diameter from end to end and having a groove or slot 5 formed longitudinally and centrally in the inner end and extending transversely from side to side thereof, whereby to form a fork or bifurcation the separated walls or prongs of which are integral with the body portion and have their outer faces curved in the direction of their widths and disposed in a common arc concentric to the longitudinal axis and coincident with the circumferential arc of said body portion. The two prongs of the shaft-section B are for convenience designated by 6 and 6', and those of the section B' are designated by 7 and 7'. The walls or prongs of each shaft-section are slabbed off at opposite side edges, as at 8, whereby to reduce their widths sufficiently to permit free movements of the prongs of one section, when the shaft-sections are connected, between the walls or prongs of the adjacent shaft-section, the inner faces of the prongs of each shaft-section being disposed in parallelism with the longitudinal axis of said section and the extreme outer ends of said prongs being rounded off in the direction of their widths for obvious reasons.

The gyroscopic connector or coupling device C between the two coupling-heads or shaft-sections is shown consisting of two concentric members 9 and 10, one member, as 9, of which is in the nature of a tube or sleeve having parallel end faces fitting between the inner adjacent faces of the prongs of one section and having diametrically opposite plane side faces fitting between the adjacent faces of the prongs of the other section, and the other member, as 10, of which is in the nature of a roller or pin and is rotatably supported with relation to the prongs of one shaft-section, and both of which have transverse registering cylindrical openings or bores and a rectangularly-disposed solid cylindrical member 12, extending entirely through the two concentrically-disposed members 9 and 10 and connected at opposite ends to the prongs of the other shaft-section.

In the construction shown the sleeve or tube 9 not only constitutes a strengthening-bearing for the two intersecting members or pins 10 and 12, but is also constructed to constitute an oiling device whereby oil may be supplied to the bearing or wearing parts of the joint.

In constructing the tubular member 9 a round bar of steel, of slightly-greater diameter than the distance between adjacent inner faces of the two prongs of one shaft-section and of a length substantially equal to the distance between said faces, is axially bored its entire length to receive the pin 10, and the diametrically opposite side faces are slabbed off to fit between the adjacent inner faces of the two prongs of a shaft-section, as will be understood by reference to Figs. 1, 2, and 4 of the drawings, the longitudinal bore in the member 9 being of a size to permit the ready insertion and removal of said pin 10. This tubular member 9 has an annular oil chamber or recess 9' formed in the inner face thereof, in which is preferably placed a piece of felt or wicking or some suitable material adapted to absorb sufficient oil to lubricate the contacting parts or bearings of the joint, oil-holes 13 and 13' being formed transversely in said member 9 and leading from the outer face thereof to the oil-recess, whereby oil may be conveniently introduced, as will be apparent by reference to Fig. 2.

As will be readily understood by reference to the drawings, the fork-prongs of each shaft-section B and B' have central bores having a common axis disposed at right angles to and intersecting the longitudinal axis of said section, the bores of the prongs of one section being of a diameter a shade larger than the greatest diameter of the larger coupling member or pin 10 and those of the other section being of a diameter corresponding substantially to the diameter of the smaller coupling member or pin 12. In one construction (shown in Figs. 1 and 3) the two larger bores in the prongs of the shaft-section B will be tapped to receive the externally-screw-threaded bearing members hereinafter described, and the small bore in one prong of the other section B' will also be tapped to receive the externally-screw-threaded end of the pin 12, as will be hereinafter referred to. In the preferred construction and organization thereof shown in the accompanying drawings the larger coupling-pin 10 is rotatably supported at its end with relation to the prongs 6 and 6' of the member B, and the smaller coupling-pin 12, which extends transversely through the coupling-pin 10, is fixedly connected to the prongs 7 and 7' of the member B'. It will be obvious, however, that either one or both members 10 and 12 may be rotatably supported with respect to the prongs with which they are connected. Therefore it is not desired to limit this invention to the specific construction shown in the accompanying drawings.

In the drawings I have shown two sets of antifriction elements (balls) 14 and 15, respectively interposed between the end journals of the coupling pin or member 10 and the bearings therefor. (See Figs. 3 and 4.) It will be obvious, however, that the invention is not limited to the specific construction of the coupling-pin 10 or the supporting means therefor, as these may be modified within certain limits without departure from the invention.

In the construction and organization thereof shown in Figs. 3 and 4 the larger coupling pin or member 10 has diametrically-reduced journals at its outer ends supported between two sets of balls located in raceways formed between said journals and the conical inner faces of the two bearing members 16 and 17, which are screwed into the larger tapped bores in the prongs 6 and 6' of the shaft-section B, the bearing members having their outer end faces substantially flush with the outer faces of said prongs, means being provided, such as set-screws 18 and 19, for preventing rotation of the bearing members 16 and 17 when in their adjusted positions. It will be obvious, however, that other means may be provided for locking the adjustable bearing members against accidental rotation.

In the construction shown in the accompanying drawings the smaller coupling-pin 12 is shown symmetrical or of substantial uniform diameter from end to end, one end of said pin being externally screw-threaded, as at 20, and having a screw-threaded bearing in the tapped bore of one of the fork-prongs, as 7, of the shaft-section B', the opposite end of said pin having means, such as a notch 21, whereby said pin may be turned in assembling and disassembling.

As a convenient means for locking the coupling-pin 10 against rotation when in its assembled position, a set-screw 22 is shown screwed into a screw-threaded hole formed partly in the periphery of the pin 10 and partly in the inner face of the bore of the prong in which this end of the pin is seated, as will be understood by reference to Figs. 1 and 2 of the drawings. It will be obvious, however, that other means may be provided for locking the coupling-pin against rotation.

The construction above described, whereby the pin 10 has one end thereof screwed into one prong of the shaft-section to which it is connected, facilitates the ready assembling and disassembling of the parts of the universal joint, as it is simply necessary in disassembling the parts to remove the locking device or set-screw 22, unscrew the pin 10, and draw the same out, which will leave the large pin 10 in condition for ready removal.

I claim—

1. A universal joint embodying two forked shaft-sections; a coupling-center having two cylindrical members one of which extends transversely through the other and is threaded at one end into the prong of one shaft-section; and a locking device in connection with the threaded member.

2. A universal joint comprising two forked shaft-sections; a coupling-center embodying two cylindrical members one of which extends transversely through the other and has a screw-threaded bearing at one end in the prong of one section, and the other of which is supported at opposite ends for rotative movements in the prongs of the other section, and both of which have their end faces flush with the outer faces of said prongs; and a set-screw engaging one prong and the threaded member whereby to lock said member against rotation with relation to said prong.

3. A universal joint embodying two forked shaft-sections; and a coupling-center between said sections consisting of two concentrically-disposed cylindrical members each having a central circular transverse opening therethrough, the opening in one registering with that of the other, and the inner member of which is supported at opposite ends in the prongs of one section; and a transversely-disposed cylindrical member extending entirely through and supported for rotative movements in the two concentrically-disposed members and having a screw-threaded bearing at one end in one prong of the other section.

4. A universal joint consisting of two cylindrical shaft-sections or coupling-heads of uniform diameter from end to end and each having an integral fork at the inner end thereof the outer faces of the prongs of which are disposed in a common arc coincident with the circumferential arc of the body portion of said section; two concentric members one of which extends through the other and is rotatably supported at its ends in the prongs of one fork; a second cylindrical member extending through the two concentric members and having a screw-threaded bearing at one end in one prong of the other fork; and a set-screw disposed in parallelism with the axis of the second member and engaging the prong and said second member, whereby to lock said member against rotation with relation to said prong.

5. A universal joint consisting of two cylindrical shaft-sections or coupling-heads of uniform diameter from end to end and each having an integral fork at the inner end thereof the outer faces of the prongs of which are disposed in a common arc coincident with the circumferential arc of the body portion of said section; two concentric members one of which extends through the other and is rotatably supported at its ends in the prongs of one fork; a second cylindrical member extending through the concentric members and having a screw-threaded bearing at one end in one prong of the other fork; and a locking device in connection with the opposite end of said second cylindrical member.

6. A universal joint consisting of two cylindrical forked shaft-sections the forks of each section of which are formed integral with the body portion and have their outer faces curved in the direction of their widths in a common arc coincident with the circumferential arc of the body portion and having their inner faces parallel with the longitudinal axis of said section; two relatively transverse members one of which extends through and is supported for rotative movement in the other and the inner one of which is rotatably connected at opposite ends to the fork of one section and the other of which has a screw-threaded bearing at one end in one fork of the other section; and a set-screw for locking the last-mentioned member against rotation.

7. A universal joint comprising two forked shaft-sections; a coupling-center for said sections including an oil-chamber disposed to supply oil to the bearing parts, and also including two relatively rotative members having intersecting axes of movement; balls interposed between the ends of one member and the forks of one section; and adjustably-supported bearing members in connection with said balls.

8. A universal joint comprising two shaft-sections having integral forks at the inner ends thereof; internally-conical bearing members adjustably supported in transverse bores in the two prongs of one fork; a coupling-pin having opposite ends thereof supported in coöperative relation with the adjustable bearing members; balls interposed between the bearing members and adjacent ends of this pin; a smaller pin extending through a transverse opening in the first-mentioned pin and having a screw-threaded bearing at one end in one prong of the other fork; and means for locking this pin against rotation.

9. A universal joint comprising two cylindrical forked shaft-sections, the forks of each section of which are formed integral with the body portion and have their outer faces curved in the direction of their widths in a common arc coincident with the circumferential arc of the body portion; two relatively transverse members one of which extends through, and is supported for rotative movement in, the other and both of which have their opposite ends extending into bores in the prongs of their respective sections; cone-bearings adjustably seated in the bores of the prongs of one section; and balls disposed between said cone-bearings and ends of one member.

10. A universal joint comprising two forked shaft-sections; a gyroscopic connector between the forks of the two sections, and including two relatively rotative members disposed with their axes of movement in intersecting planes and one of which members includes an oil-chamber adapted for supplying oil to the bearing parts.

11. A universal joint comprising two cylindrical shaft-sections of uniform diameter from end to end and each having an integral fork at the inner end thereof, the outer faces of the prongs of which are disposed in a common arc coincident with the circumferential arc of the body portion of said section; a tubular member disposed between the prongs of the two forks and having an oil-chamber formed in the inner face thereof with an oil-hole leading thereto; a coupling-pin in connection with the prongs of one fork and extending into the oil-chamber of the tubular member; and a second coupling-pin in connection with the prongs of the other fork and extending into said oil-chamber with its axis in intersecting relation to the axis of the first-mentioned pin.

Signed by me at Hartford, Connecticut, this 25th day of October, A. D. 1900.

FRANK E. BOCORSELSKI.

Witnesses:
E. C. WHITNEY,
L. C. WOOD.